Dec. 1, 1925.

E. D. TILLYER

OPHTHALMIC LENS

Filed July 6, 1925

1,563,806

Inventor
Edgar D. Tillyer.
By Harry H. Styll.
Attorney

Patented Dec. 1, 1925.

1,563,806

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed July 6, 1925. Serial No. 41,734.

*To all whom it may concern:*

Be it known that I, EDGAR D. TILLYER, a citizen of the United States, residing at Southbridge, in the county of Worcester and State of Massachusetts, have invented certain new and useful Improvements in Ophthalmic Lenses, of which the following is a specification.

The present invention relates to the manufacture of ophthalmic lenses, and more particularly to an improved method of making lenses of that type which, when completed, are formed with a concave surface having different curves in at least two meridians, such for instance as a toric lens.

Because of the various difficulties encountered in the rough grinding and polishing of concave toric lens surfaces and the accurate and expensive machine required for accomplishing this purpose, I have provided a method to be more fully hereinafter described, which will overcome these difficulties and which will permit partially finished concave toric blanks to be simply and cheaply made.

Prior to the present invention there has been produced a method for making such a lens, which consists in first preparing a glass blank provided with a concave ground and polished spherical surface on one side and a convex toric surface on the opposite side, placing the concave spherical surface of the blank upon a mold having a convex toric surface and then heating the blank sufficiently to cause it to drop into contact with and conform to the surface of the mold. The difficulty with this method, however, is that the concave toric surface which is being formed, comes into contact with the mold, with the result that it is liable to become injured due to the effect of the mold upon the lens surface and after the concave toric surface has been formed it must not only be polished but also ground to remove the scale and mold marks.

The object of the present invention, therefore, is to produce a method for molding lenses of the character stated, wherein after the lens has been finished the surface thereof will not have been affected during the molding operation, thereby eliminating any necessity for any after grinding or polishing.

It is also an object of the present invention to mold a blank of this character in such a manner that during the making thereof the concave toric surface which is being formed will at no time come into contact with the mold.

A still further object of the invention is to provide such a blank which may be easily and cheaply produced and from which the optician can readily finish the required lens without any difficulty.

In the drawings forming a part of this application, and in which has been shown an example of the mode of procedure:

In carrying out my method, and referring to the accompanying drawing, I first form, as by molding or pressing, a blank of glass of the required refractive index, this blank being indicated by A, and having a concave spherical surface 10, which may be considered as having a curvature of 7 diopters, or 7 D. This spherical surface is both ground and polished, or, in other words, completely finished, before the blank is placed in the mold.

The opposite or convex side 11 of the blank is formed with a toric surface, the curvature of the longitudinal meridian of which may, for the purpose of illustration, be considered as 7 diopters, while the curvature of the transverse meridian of this surface is 6 diopters. Unlike the concave spherical surface 10, this toric convex surface 11 need not be completely finished, but it is necessary that it at least be accurately formed before the blank is placed in the mold.

Figure 1:
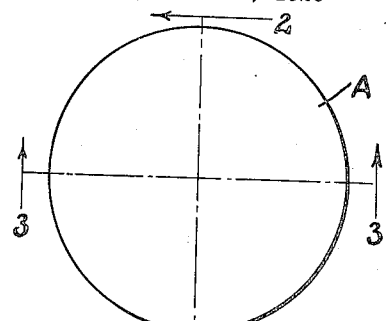
Figure 1 is a plan view of a lens blank prior to its having been molded.
Figure 2:
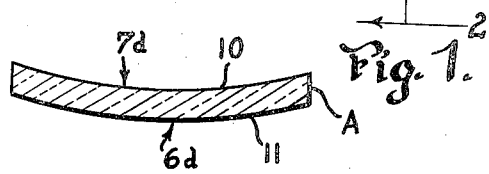
Figure 2 is a transverse sectional view thereof on the line 2—2 of Figure 1.
Figure 3:
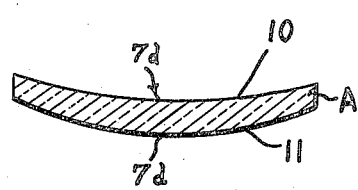
Figure 3 is a similar view on the line 3—3 of Figure 1.
Figure 4:
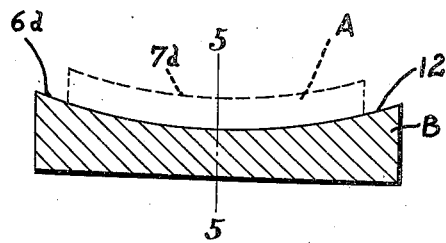
Figure 4 is a transverse sectional view of the mold showing in dotted lines a lens blank placed thereon.
Figure 5:
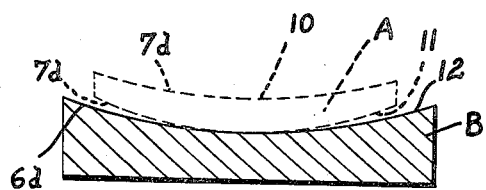
Figure 5 is a view taken on line 5—5 of Figure 4.

I then provide a mold or block B having a smooth concave spherical surface 12 of a curvature of 6 diopters. The lens blank A is then placed on the mold, as shown by the dotted lines in Figures 4 and 5, with its convex toric surface 11 in contact therewith. The said mold, together with the blank is then placed in a suitable furnace, and the blank heated sufficiently to allow it to soften, whereupon it will drop into contact with the mold surface 12 and cause the convex toric surface 11 of the said blank to conform to the curvature of the spherical concave surface of the mold.

Figure 6:
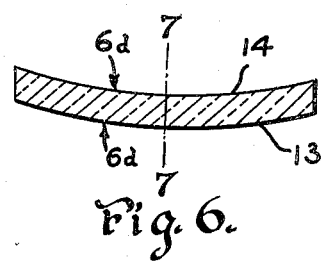
Figure 6 is a view similar to Figure 2 after the blank has been removed from the mold.
Figure 7:
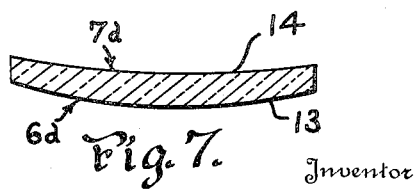
Figure 7 is a view taken on line 7—7 of Figure 6.

This dropping operation will alter or modify the whole shape of the lens blank and the curvatures of the surfaces 10 and 11 will be altered to those as shown in Figures 6 and 7, in which the convex toric surface 11, having conformed to the curve of the mold surface 12, will present an aproximately spherical surface 13 on a 6 diopter spherical curve, while the ground and polished spherical surface 10 will be changed to a concave toric surface 14 having its longitudinal meridian on a 7 diopter curve and its transverse meridian on a 6 diopter curve. The blank is then removed from the mold or block and the convex spherical surface 13 thereof subsequently ground and polished to form a finished lens.

As hereinabove stated, the concave spherical surface 10 of the blank A is both ground and polished before being placed in the mold, and during the dropping operation it does at no time come into contact therewith. Consequently this concave finished surface is in no way injured during the dropping thereof, with the result that after the blank is removed from the mold no further grinding or polishing thereof is necessary.

It will, of course, be understood that while I have mentioned that the mold surface is on a 6 diopter curve, this is merely for the purpose of illustration, and that the mold surface may be of any curvature, as well as the surfaces of the lens blank to be molded. I do not, therefore, desire to limit myself to the particular curvatures or diopters mentioned herein.

It can readily be appreciated from the above that by means of my improved method herein disclosed there is not only secured a considerable economy in the production of this type of lens, but also that they can be made without the necessity for the former tedious and expensive concave toric rough grinding.

Having thus described my invention, I claim:

1. A process for producing ophthalmic lens blanks consisting in providing a glass blank with a finished spherical surface and an accurately formed toric surface, placing the blank on a block having a spherical surface, and changing the finished surface to toric form by dropping the blank, under the action of heat, on the block with its originally formed toric surface contacting the block.

2. A process for producing ophthalmic lens blanks consisting in providing a glass blank with a finished spherical surface and an accurately formed toric surface, softening the blank by heat and dropping it on a block whereby to change the finished spherical surface to toric form without injury to the finished surface.

3. A process for producing ophthalmic lens blanks consisting in providing a glass blank with a finished concave spherical surface on one side and an accurately formed convex toric surface on its other side, placing the toric side of the blank on a block having a concave spherical surface, and heating the blank, thereby changing the finished spherical surface to toric form without injury to the finish of the said surface.

4. A process for producing ophthalmic lens blanks consisting in providing a glass blank with a concave spherical surface and a convex toric surface, placing the blank on a block having a concave spherical surface with the said toric surface of the blank contacting therewith, and heating said blank to cause the same to drop, whereby the convex toric surface will conform to the curvature of the surface of said block, thereby changing the convex toric surface to a spherical and the concave spherical surface to a toric, without bringing the finished concave toric surface of the blank into contact with the block.

EDGAR D. TILLYER.